United States Patent
Patzelt et al.

[11] Patent Number: 5,927,754
[45] Date of Patent: Jul. 27, 1999

[54] AIR BAG

[75] Inventors: Helmut Patzelt, Kernen; Wolfgang Russ, Gingen/Fils; Karl Peitsmeier, Neuhausen; Wolfgang Kerner, Rottenburg, all of Germany

[73] Assignee: Mercedes-Benz AG, Germany

[21] Appl. No.: 08/116,753

[22] Filed: Sep. 7, 1993

[30] Foreign Application Priority Data

Sep. 4, 1992 [DE] Germany .............................. 42 29 564

[51] Int. Cl.⁶ .................................................. B60R 21/28
[52] U.S. Cl. ........................................ 280/739; 280/743.2
[58] Field of Search ................................ 280/728 R, 730, 280/731, 732, 739, 743 R, 743 A, 743.1, 743.2

[56] References Cited

U.S. PATENT DOCUMENTS

| | | | |
|---|---|---|---|
| 3,481,625 | 12/1969 | Chute | 280/739 |
| 4,887,842 | 12/1989 | Sato | 280/743 A |
| 4,921,735 | 5/1990 | Bloch | 280/743 A |
| 4,966,389 | 10/1990 | Takada | 280/743 A |
| 5,114,180 | 5/1992 | Kami et al. | 280/739 |
| 5,215,795 | 6/1993 | Matsumoto et al. | 280/743 R |

FOREIGN PATENT DOCUMENTS

| | | |
|---|---|---|
| 0 478 897 | 4/1992 | European Pat. Off. . |
| 0 478 897 A1 | 4/1992 | European Pat. Off. . |
| 4031325 | 4/1991 | Germany . |
| 4033835 | 4/1991 | Germany . |
| 40 38 287 | 6/1991 | Germany . |
| 63-34752 | 3/1988 | Japan . |
| 2 237 249 | 5/1991 | United Kingdom . |
| 2 239 433 | 7/1991 | United Kingdom . |

*Primary Examiner*—Paul N. Dickson
*Attorney, Agent, or Firm*—Evenson, McKeown, Edwards & Lenahan, P.L.L.C.

[57] ABSTRACT

The invention relates to an air bag for occupant restraint systems of motor vehicles, which air bag is automatically inflated by means of a gas generator in the event of an accident. In order subsequently to allow slackening of the air bag, a kidney-shaped or crescent shaped zone of the air bag cover, which is arranged at a greater distance from and approximately centrally to a central region of the air bag facing the occupant, is produced from gas-permeable fabric. Due to the specified shape and arrangement of this zone, the necessary load-bearing capacity of the air bag remains guaranteed.

4 Claims, 1 Drawing Sheet

AIR BAG

BACKGROUND AND SUMMARY OF THE INVENTION

The invention relates to an air bag for occupant restraint systems in motor vehicles, which air bab is automatically and rapidly inflated by a gas generator to form a balloon-like hollow body in the event of an accident. The air bag wall which is substantially nonpermeable to gas is reinforced in a central region facing the occupant and, on the inside of the air bag, is connected to catch straps in such a way that the air bag assumes a flattened, lenticular shape, with outlet possibilities for the gas produced by the gas generator.

Air bags of this type have already been used as a standard fitting in motor vehicles for a relatively long time and have proved to be expedient. It is important for a good protective effect that the air bag only remains inflated for a relatively short time and then becomes slack again. This avoids that the air bag, which has been inflated in the manner of a cushion, is substantially only elastically deformed upon impact of the occupant and thus hurls the occupant back after the impact with correspondingly great force.

An air bag of this type is known from German Patent Document DE 4,033,835 A1, whose shaping is influenced by catch straps in such a way that, in the inflated state, an approximately lenticular hollow body results. The construction of gas outflow apertures, whose presence is essential in order to allow slackening of the inflated air bag, is not explained in greater detail in this publication.

In this context, it is known from German Patent Document DE 4,031,325 A1 to arrange in an air bag an annular, gas-permeable zone which concentrically surrounds a central attachment region.

It has been established in practice that this type of construction of the air bag is not yet optimum in terms of simple producibility and good strength.

An object of the invention is therefore to provide an air bag of the type specified above, which can be produced in a simple manner and is distinguished by a high strength.

According to the invention, this object is achieved by the combination of the following features:
  a) the wall of the air bag consists of fabric which is permeable for the gases of the gas generator within a kidney-shaped or crescent-shaped zone which is spaced away from the central region and is approximately concentric thereto; and
  b) the gas-permeable fabric is oriented in warp and weft at an angle of about 45° to the warp and weft of the fabric forming the remaining wall of the air bag.

Due to the arrangement according to the invention, the gas-permeable fabric as well as the seams joining said fabric to the remaining air bag cover and the corresponding edge zones are loaded very evenly.

In particular, it is guaranteed that the catch straps attached as appropriate, on the inside central region of the air bag cover, are unable to exert any impermissibly large forces on the gas-permeable fabric.

Other objects, advantages and novel features of the present invention will become apparent from the following detailed description of the invention when considered in conjunction with the accompanying drawings.

DETAILED DESCRIPTION OF THE DRAWINGS

The air bag 1 illustrated in an inflated state protects the driver of a motor vehicle from impact on the steering wheel 2 in the event of an accident. For this purpose, the air bag 1 is automatically inflated in the event of an accident by means of a gas generator (not illustrated) which is arranged inside a housing which is accommodated in the hub of the steering wheel 2 and also accommodates the air bag 1 which is folded up when not in use.

In the inflated state, the air bag 1 has a substantially lenticular shape, such that the side of the air bag 1 facing the driver is relatively weakly curved or clearly flattened and supports the driver over a large area in the event of an impact.

Figure 1:
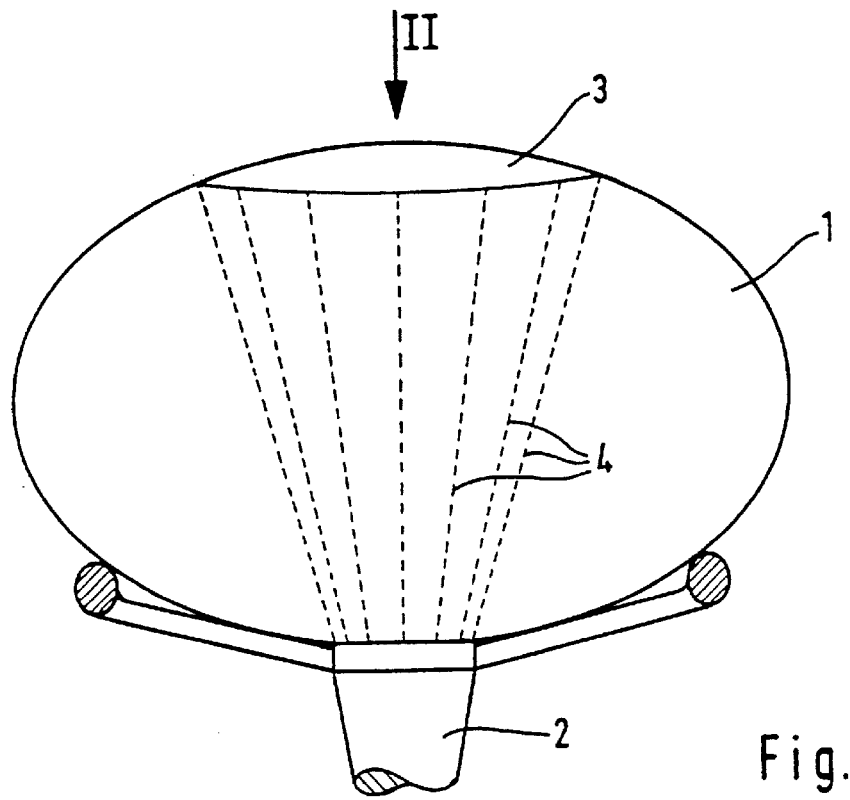
FIG. 1 is a lateral schematic view of an inflated air bag which is arranged on the driver's side on the steering wheel, constructed according to a preferred embodiment of the invention.

In order to guarantee this lenticular shape in an inflated state of the air bag 1, a central region 3 of the air bag cover is of reinforced construction and is connected on the inside to catch straps 4 (indicated by dotted lines in FIG. 1) whose ends which are remote from the central region 3 are connected directly or indirectly to parts of the hub of the steering wheel 2.

In order to guarantee that the air bag 1 remains inflated only for a short time and becomes slack again after inflation, the cover of the air bag 1 consists of a gas-permeable fabric, for example of an aramide material, within a zone 5. The zone 5 has an approximately kidney-shaped contour and is arranged approximately centrally to the central region 3, but at a greater distance away from the central region 3. Accordingly, the long edges of the zone 5 form approximately concentric arcs relative to one another, whose center of curvature falls within the central region 3.

The kidney shape of the zone 5 illustrated is optimum in terms of strength, in particular if, additionally, the gas-permeable fabric is arranged in warp and weft at an angle of 45° relative to the fabric forming the remaining air bag cover.

Figure 2:
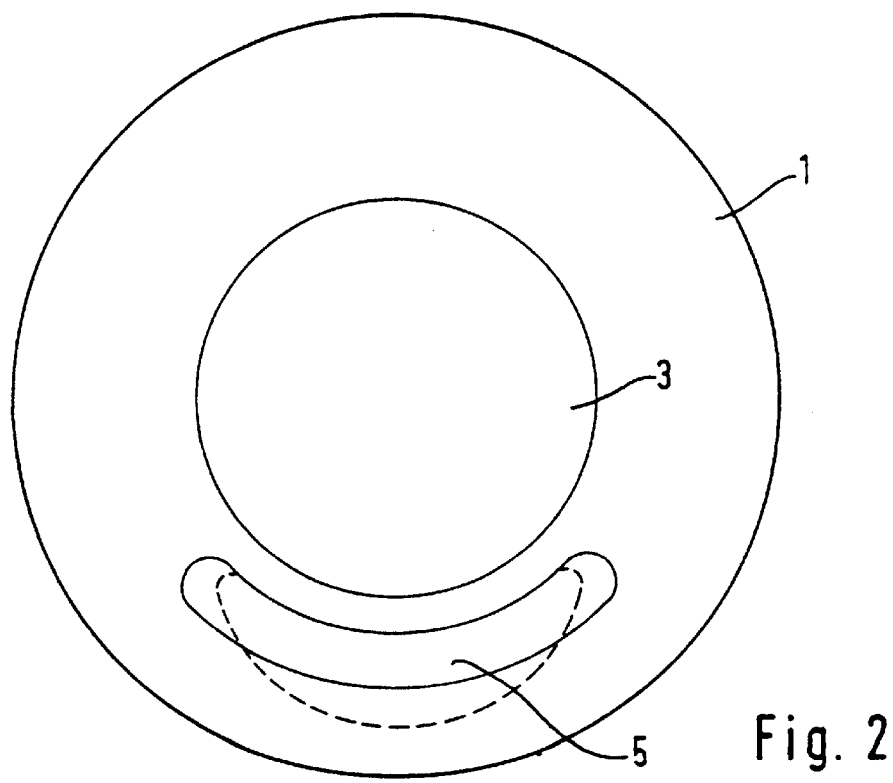
FIG. 2 shows a plan view of the air bag taken in the direction of arrow II in FIG. 1.

However, instead of the kidney shape, the zone 5 can also have a crescent-shaped contour, such as is indicated by dashed lines in FIG. 2. Compared with the kidney shape, the crescent shape leads to only slight strength losses and causes only extremely small wastage.

A special advantage of the invention lies in the fact that the zone 5 can have a relatively large areal extent due to its shape and arrangement, while the strength of the air bag 1 and of its cover remains guaranteed. The flow resistance which is optimum (relatively low) for the safety function of the air bag 1 can thus be guaranteed for the gases passing through the zone 5, in that the zone 5 has an area, for example, of about 850 cm$^2$.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An air bag for a vehicle occupant restraint system, having an air bag wall which is substantially nonpermeable to gas and defines a balloon-like hollow body for cushioning an occupant when in an inflated condition;

said air bag wall including a reinforced central section attached to restraining catch straps such that the air bag assumes a flattened elliptical shape;

wherein the air bag wall includes a gas permeable fabric section within a curved section spaced radially from the central section and at a side of the airbag facing an occupant when in an inflated condition; and wherein the gas-permeable fabric is oriented in warp and weft at an angle of about 45° to the warp and weft of the fabric forming the wall of the air bag.

2. An airbag according to claim 1, wherein said gas permeable fabric section is a crescent-shaped section disposed radially outside the central section.

3. An airbag according to claim 1, wherein said gas permeable fabric section is a kidney-shaped section disposed radially outside the central section.

4. An airbag according to claim 1, wherein said airbag is configured for disposition in a vehicle steering wheel with said catch straps connected to parts of a vehicle steering wheel hub.

* * * * *